US008843587B2

(12) United States Patent  
Los (10) Patent No.: US 8,843,587 B2  
(45) Date of Patent: Sep. 23, 2014

(54) RETRIEVING AVAILABILITY INFORMATION FROM PUBLISHED CALENDARS

(75) Inventor: David Los, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 188 days.

(21) Appl. No.: 13/368,267

(22) Filed: Feb. 7, 2012

(65) Prior Publication Data

US 2013/0204964 A1 Aug. 8, 2013

(51) Int. Cl.
*G06F 15/16* (2006.01)
(52) U.S. Cl.
CPC ...................................... *G06F 15/16* (2013.01)
USPC ............................................... 709/217; 705/9
(58) Field of Classification Search
CPC .................................... G06F 15/16; G06F 1/12
USPC .................................... 709/201, 217; 726/4, 1
See application file for complete search history.

(56) References Cited

U.S. PATENT DOCUMENTS

| | | | |
|---|---|---|---|
| 6,216,110 B1* | 4/2001 | Silverberg | 705/7.19 |
| 6,823,357 B1 | 11/2004 | Du et al. | |
| 7,668,900 B2 | 2/2010 | Fishman et al. | |
| 7,870,194 B2 | 1/2011 | Michel et al. | |
| 8,185,932 B2* | 5/2012 | Dunn | 726/1 |
| 8,261,329 B2* | 9/2012 | Gurney et al. | 726/4 |
| 2004/0141005 A1 | 7/2004 | Banatwala et al. | |
| 2006/0265660 A1 | 11/2006 | Hullot et al. | |
| 2008/0133641 A1 | 6/2008 | Gent et al. | |
| 2008/0140498 A1 | 6/2008 | Setty et al. | |
| 2008/0294994 A1 | 11/2008 | Kruger et al. | |
| 2009/0198728 A1 | 8/2009 | Davia et al. | |
| 2009/0234699 A1 | 9/2009 | Steinglass et al. | |
| 2010/0122190 A1 | 5/2010 | Lu | |
| 2010/0186079 A1* | 7/2010 | Nice et al. | 726/14 |
| 2010/0241711 A1* | 9/2010 | Ansari et al. | 709/205 |
| 2010/0281484 A1 | 11/2010 | Myhre | |
| 2011/0137664 A1 | 6/2011 | Kho et al. | |
| 2011/0252351 A1* | 10/2011 | Sikora et al. | 715/769 |

OTHER PUBLICATIONS

"International Search Report", Mailed Date: May 15, 2013, Application No. PCT/US2013/024243, Filed Date: Feb. 1, 2013, pp. 10.
"Sharing with External Networks", Retrieved at <<http://www.icewarp.com/support/online_help/3983.htm>>, Retrieved Date: Dec. 19, 2011, pp. 3.
"Rich Web Collaboration", Retrieved at <<http://www.zimbra.com/products/calendar-collaboration.html>>, Retrieved Date: Dec. 19, 2011, pp. 8.

* cited by examiner

*Primary Examiner* — Vivek Srivastava
*Assistant Examiner* — Gary Dennis
(74) *Attorney, Agent, or Firm* — Louise Bowman; Jim Ross; Micky Minhas (57) ABSTRACT

An application retrieves a published calendar from an online calendar application. The application formats the published calendar according to user status states such as "free" or "busy." The application can also alternatively assign user status information from the published calendar to users status state levels such as "free," "tentative," "out of office," "busy," and "remotely available." The application matches calendar owner information to a contact from a contact list of the application in order to link the formatted calendar to the contact. The application presents the linked calendar for scheduling.

20 Claims, 6 Drawing Sheets

RETRIEVING AVAILABILITY INFORMATION FROM PUBLISHED CALENDARS

BACKGROUND

Instant communications, audio/video conferences, data exchanges, whiteboard sharing sessions, and comparable ones are features of constantly developing computing and networking technologies enabling business entities to decentralize in order to provide work environments better suited to demand. Decentralization of work environments also benefits employee and clients alike by enabling employees to support client from client locations.

Modern systems drive user processes to independently hosted solutions. Current online solutions provide multiple services that were frequently provided in the past through legacy device specific applications. Centralized solutions such as online applications improve availability and minimize data loss risk. Online calendar applications enable users to manage their schedule from variety of locations using multitude of devices. However, expanding the capabilities of such applications with existing and future solutions provide multiple challenges. In the mobile device integrated world, static applications have a difficult time accommodating live data provided by mobile devices. Static applications such as online calendar applications rarely expand beyond scheduling functionality and fail to meet ever changing demands of mobile solutions.

In conventional systems, when a user requests availability information for someone outside of their organization, the request typically fails and the user just sees a placeholder or error message. Sometimes, one or more characters or an icon may represent that the request failed and no calendar information is available for the particular user. This may degrade user experience, and the users may have to determine if the invited user is available for a meeting through other means such as a call, an email, or a text message. Thus, using the calendar for scheduling a meeting may end up being more complex and drawn out for users in distinct systems.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to retrieving availability information from published calendars. According to some embodiments, an application may retrieve a published calendar from a calendar service provider. The service provider may be a web server hosting a web based calendar application. The application may format the published calendar. The formatting may include assigning user status states to retrieved status information from the published calendar. Subsequently, the application may link the formatted calendar to a contact. The application may match identifier information from the published calendar to an available contacts list. Next, the application may present the linked calendar for scheduling.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, an application may retrieve availability information from published calendars. The application may retrieve a published calendar. The published calendar may be a web application hosted by a calendar service provider. The application may format the published calendar. The formatting may involve converting status information of the calendar owner to user status states including a free or a busy state. Subsequently, the application may link the formatted calendar to a contact. The contact may be determined from a list of contacts available to the application. The application may match calendar owner information to a contact within the list of contacts. Next, the application may present the linked calendar for scheduling. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer-readable memory device. The computer-readable storage medium can for example be implemented via one or more of a volatile computer memory, a non-volatile memory, a hard drive, a flash drive, a floppy disk, or a compact disk, and comparable media.

A published calendar may be provided by a web application providing scheduling services to users. A communication or scheduling application may access the published calendar through a variety of communication protocols including: secure hyper-text transfer protocol (https), hyper-text transfer protocol (http), file transfer protocol (ftp), and secure file transfer protocol (sftp). Published calendars may include availability information corresponding to user statuses such as free, busy, tentative, and comparable ones. Because different calendar applications may employ different statuses, availability information may be formatted to a user status employed by the user's application/service.

Throughout this specification, the term "platform" may be a combination of software and hardware components for retrieving availability information from published calendars. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
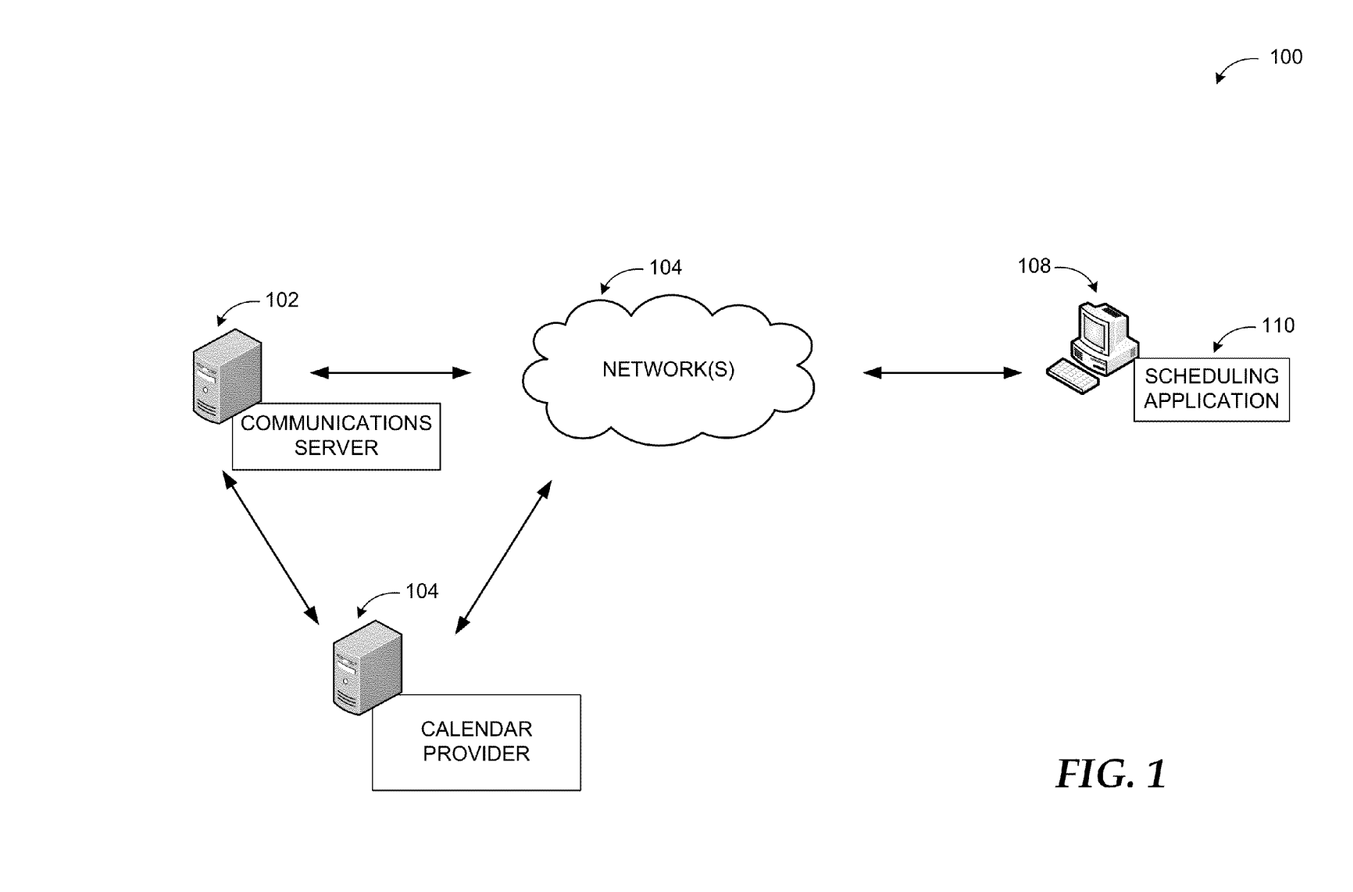
FIG. 1 illustrates a networked environment, where an application may retrieve availability information from published calendars according to some embodiments.

Referring to FIG. 1, diagram 100 illustrates a networked environment, where an application may retrieve availability information from published calendars according to some embodiments. The computing devices and computing environments shown in diagram 100 are for illustration purposes. Embodiments may be implemented in various local, networked, cloud-based and similar computing environments employing a variety of computing devices and systems, hardware and software.

In an example environment illustrated in diagram 100, a client application (e.g. a scheduling application 110) executed on client device 108 may display a user interface for the scheduling application 110. The communications server 102 may provide the calendar services resources. An application running on server 102 may manage the calendar services resources and provide scheduling information upon demand to the scheduling application 110. Although the application is described as a server application in various embodiments, the application may reside on a single client device and be part of a client application solution.

The calendar provider 104 may host a web application providing calendar services for external users. The calendar provider may be an online or web calendar service provider. The application may access a published calendar by the calendar provider 104 and retrieve availability information of an external user such as the calendar owner. The availability information may be formatted, linked to a contact, and forwarded to the scheduling application 110 upon demand.

Figure 2:
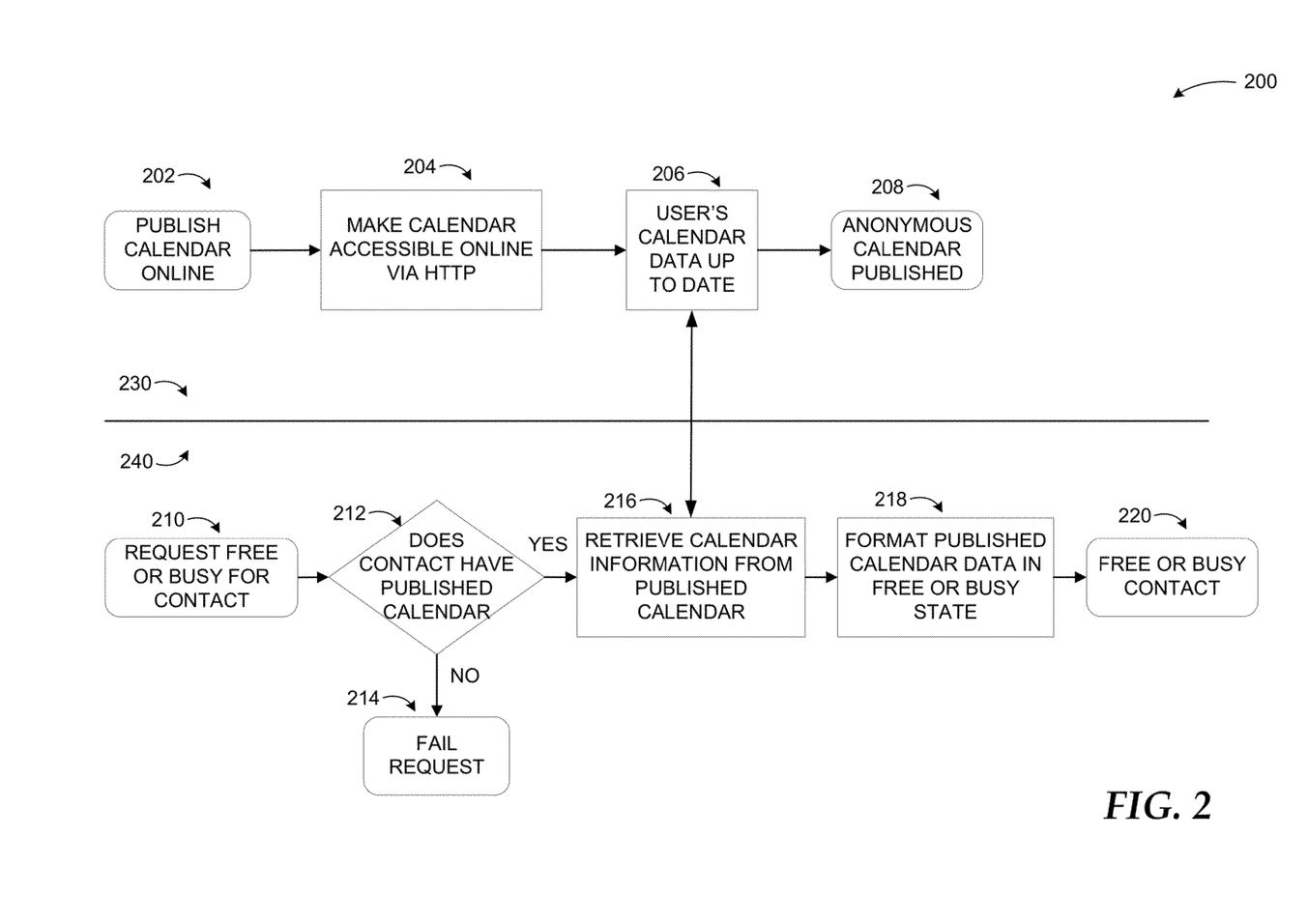
FIG. 2 illustrates a flow diagram establishing a process of retrieving availability information from published calendars according to embodiments.

FIG. 2 illustrates a flow diagram establishing a process of retrieving availability information from published calendars according to embodiments. Diagram 200 displays process steps with which an application may access and retrieve availability information of a contact from a published calendar. The contact's calendar may be provided by an external calendar application. The application may refresh the contact's availability status with availability information from the external calendar application based on a predetermined schedule or upon request.

An external calendar application may provide multiple services 230 for a contact's calendar requirements. One of the services may be publishing the calendar online 202. The calendar may be made accessible to requesters such as other users and applications via an http connection 204. The external calendar application may also keep the published calendar up-to-date 206. The external application may also be enabled to publish the calendar anonymously 208. An anonymous publication may remove privacy data from the published calendar such as contact's location and description of calendar events.

An application may provide multiple services 240 to retrieve a published calendar from an external calendar application. The application may receive a request for the contact's status from another user accessing the application. An example may be a request for a free or busy state for contact 210. Upon receiving the request, the application may determine whether the contact has a published calendar at decision node 212. The application may determine whether there is an associated published calendar for the contact. The application may also determine availability from the published calendar. Upon finding no published calendars, the application may return fail request notification 214.

Upon a successful detection of the published calendar, the application may retrieve calendar information from the published calendar 216. The retrieved information may include user status such as free or busy states. The information may also include private information such as the contact's location and calendar event descriptions. Subsequently, the application may format published data in free or busy user state 218. The application may map the user statuses retrieved from the published calendar to free or busy state. An example may include mapping free or remotely available information from the published calendar to free state. Another example may include mapping busy, out of office, or tentative information from the published calendar to busy state. Other examples of state mapping may be possible. Published calendar information mapping is not limited to those described above.

The application may also map published calendar information to other state descriptions beyond the provided binary examples. An example may include mapping published calendar information to user statuses such as "free," "out of office," "tentative," "busy," or "remotely available." Subsequent to mapping the published calendar information to a user status, the application may transmit a notification of the user status. An example may include transmission of a free or busy contact notification 220.

According to some embodiments, the application may retrieve the published calendar from a web calendar service provider. The application may retrieve the published calendar from the web calendar service provider through an authenticated https connection. The application may also link the published calendar to a contact by determining identifier information of an owner of the published calendar and matching the identifier information to the contact.

According to other embodiments, the application may update presence information of the contact with the user status from the linked calendar. Alternatively, the application may update user status from the linked calendar with presence information of the contact. In an example scenario, the application may compare the contact's presence information and user status from the linked calendar to determine accuracy. The application may update either upon determining the other being up-to-date. Additionally, the application may determine a uniform resource locator (URL) address of the published calendar and download the published calendar from the URL address of a web server hosting the published calendar.

According to yet other embodiments, the application may request authorization to download the published calendar from a web calendar service provider upon a failure to retrieve the published calendar. The application may establish access to the published calendar by establishing a connection with the web calendar service provider. Subsequent to access, the application may download the published calendar through an alternative method. The alternative method may include ftp or sftp access to the published calendar server provider to retrieve the calendar.

Figure 3:
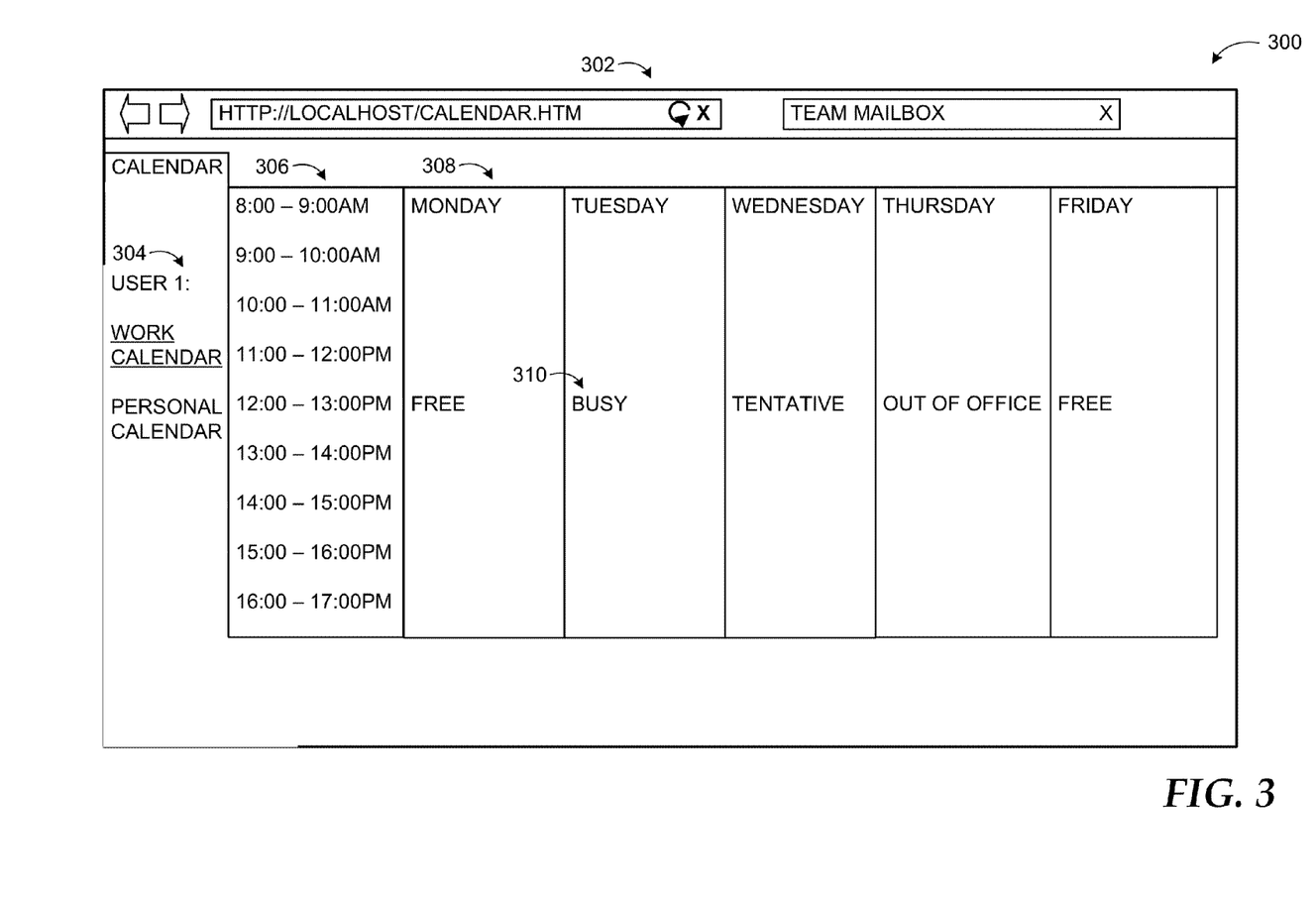
FIG. 3 illustrates an example user interface of a published calendar according to embodiments.

FIG. 3 illustrates an example user interface of a published calendar according to embodiments. Diagram 300 displays a web browser 302 displaying a calendar application.

An example user 1 (304) may have multiple calendars which may be displayed by the web browser 302. Example calendars include work and personal calendars. The calendar application may display a user's calendar events according to timeslots 306. The timeslots 306 may be predetermined according to application settings or may be user adjustable. The calendar application may also display user status according to dates. Dates may be displayed according to workdays 308. Each workday may display a user event during a timeslot for which the calendar application may display the user status 310. The user status 310 may include multiple states beyond free or busy states as discussed above.

According to some embodiments, a communication application may retrieve a published calendar associated with a contact from a web calendar service provider. The communication application may integrate the published calendar with the linked calendar. To integrate the calendars, the communication application may execute a mapping engine to evaluate the status descriptions employed by the published calendar and map them to corresponding statuses in the calendar maintained by the communication application.

According to other embodiments, identifier information retrieved from the published calendar about the calendar owner may include a name, an email address, or a user-id. Additionally, the communication application may utilize https, http, ftp, and sftp connections to retrieve the published calendar.

According to yet other embodiments, the communication application may receive a scheduled calendar event for the linked calendar from a client application. The communication application may format the scheduled calendar event according to parameters of the published calendar. The communication application may transmit the formatted scheduled calendar event to an application or service maintaining the published calendar for scheduling at the published calendar.

The example scenarios and schemas in FIGS. 2 and 3 are shown with specific components, data types, and configurations. Embodiments are not limited to systems according to these example configurations. Retrieving availability information from published calendars may be implemented in configurations employing fewer or additional components in applications and user interfaces. Furthermore, the example schema and components shown in FIGS. 2 and 3 and their subcomponents may be implemented in a similar manner with other values using the principles described herein.

Figure 4:
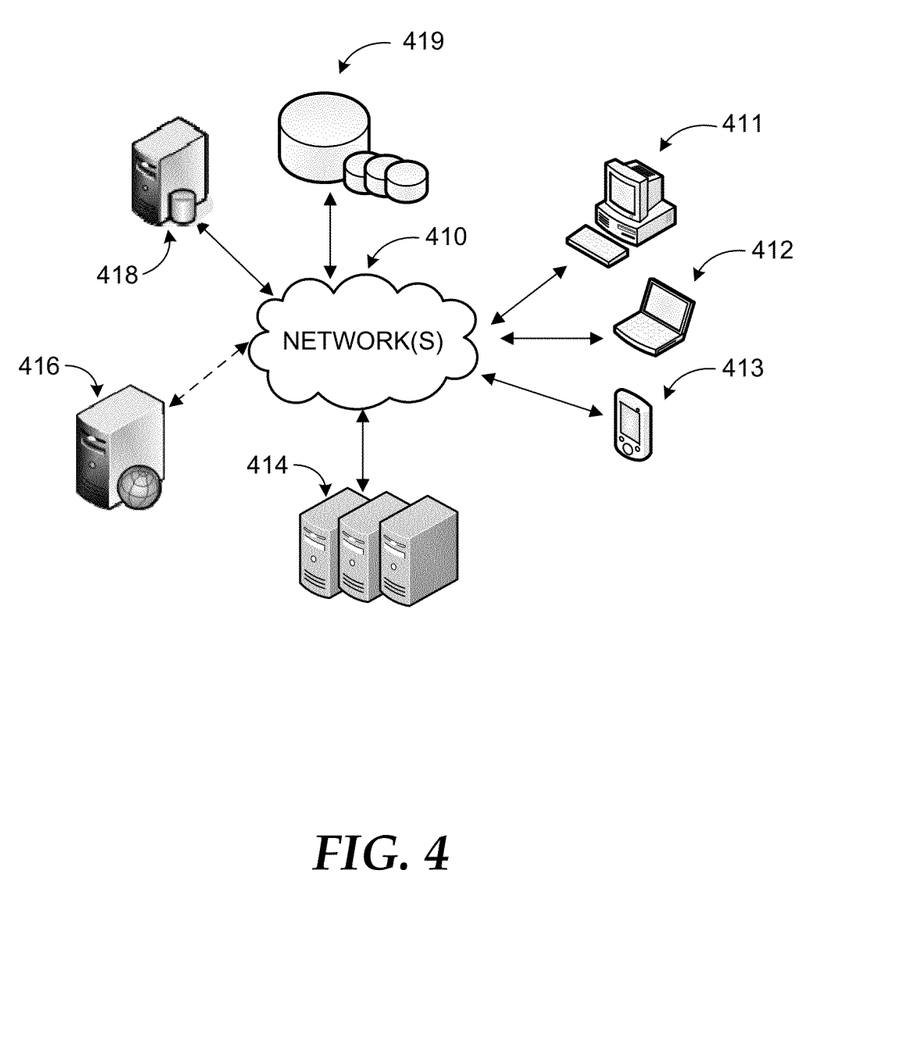
FIG. 4 is a networked environment, where a system according to embodiments may be implemented.

FIG. 4 is a networked environment, where a system according to embodiments may be implemented. Local and remote resources may be provided by one or more servers 414 or a single server (e.g. web server) 416 such as a hosted service. An application may communicate with client interfaces on individual computing devices such as a smart phone 413, a laptop computer 412, or desktop computer 411 ('client devices') through network(s) 410.

As discussed above, an application may retrieve availability information from published calendars. The availability information may be formatted to a user status state and linked to a contact. Client devices 411-413 may enable access to applications executed on remote server(s) (e.g. one of servers 414) as discussed previously. The server(s) may retrieve or store relevant data from/to data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to retrieve availability information from published calendars. Furthermore, the networked environments discussed in FIG. 4 are for illustration purposes only. Embodiments are not limited to the example applications, modules, or processes.

Figure 5:
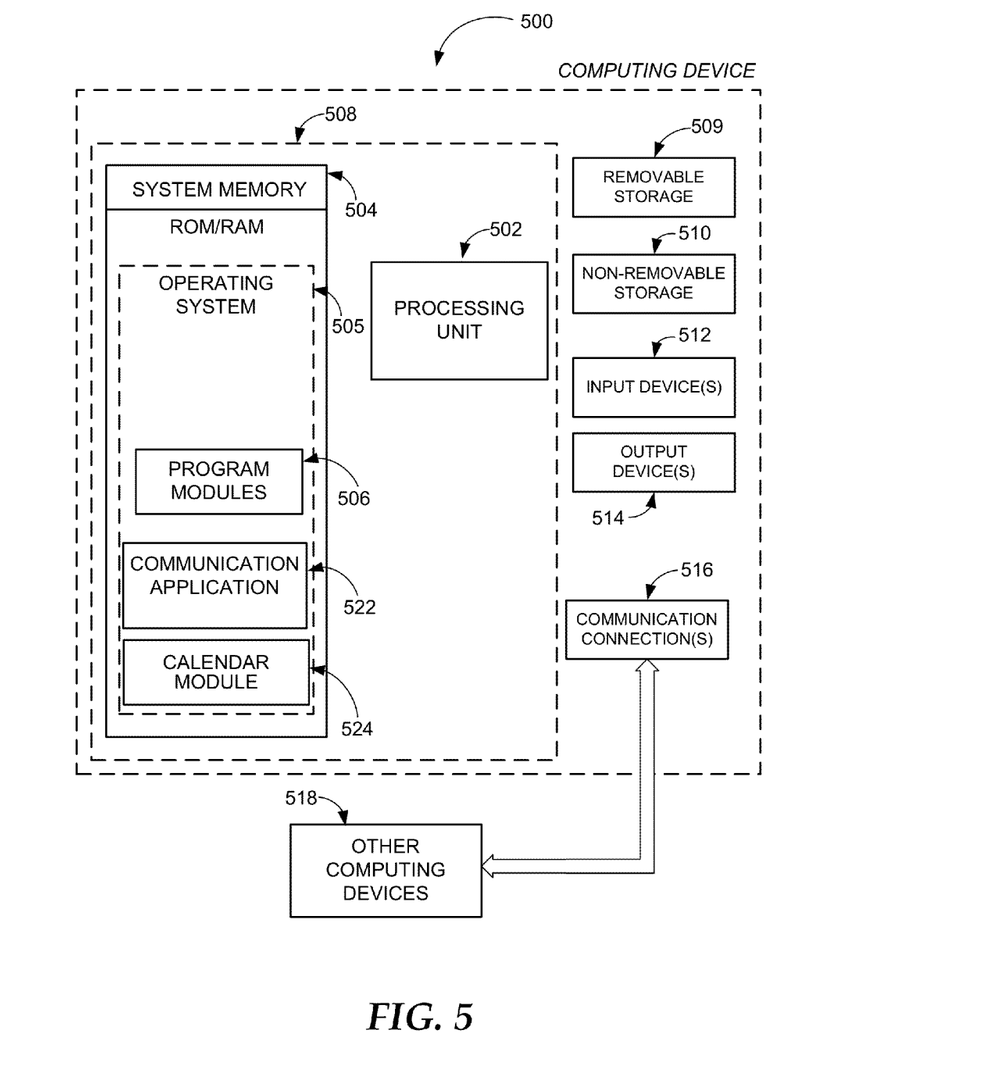
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, communication application 522, and calendar module 524.

Communication application 522 may retrieve availability information from published calendars according to embodiments. The calendar module 524 may format the availability information according to user status states such as "free" and "busy". The calendar module 524 may also integrate other published calendars associated with the contact. Up-to-date availability information from published calendars may be used to update the user status state of an associated contact. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, storage servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
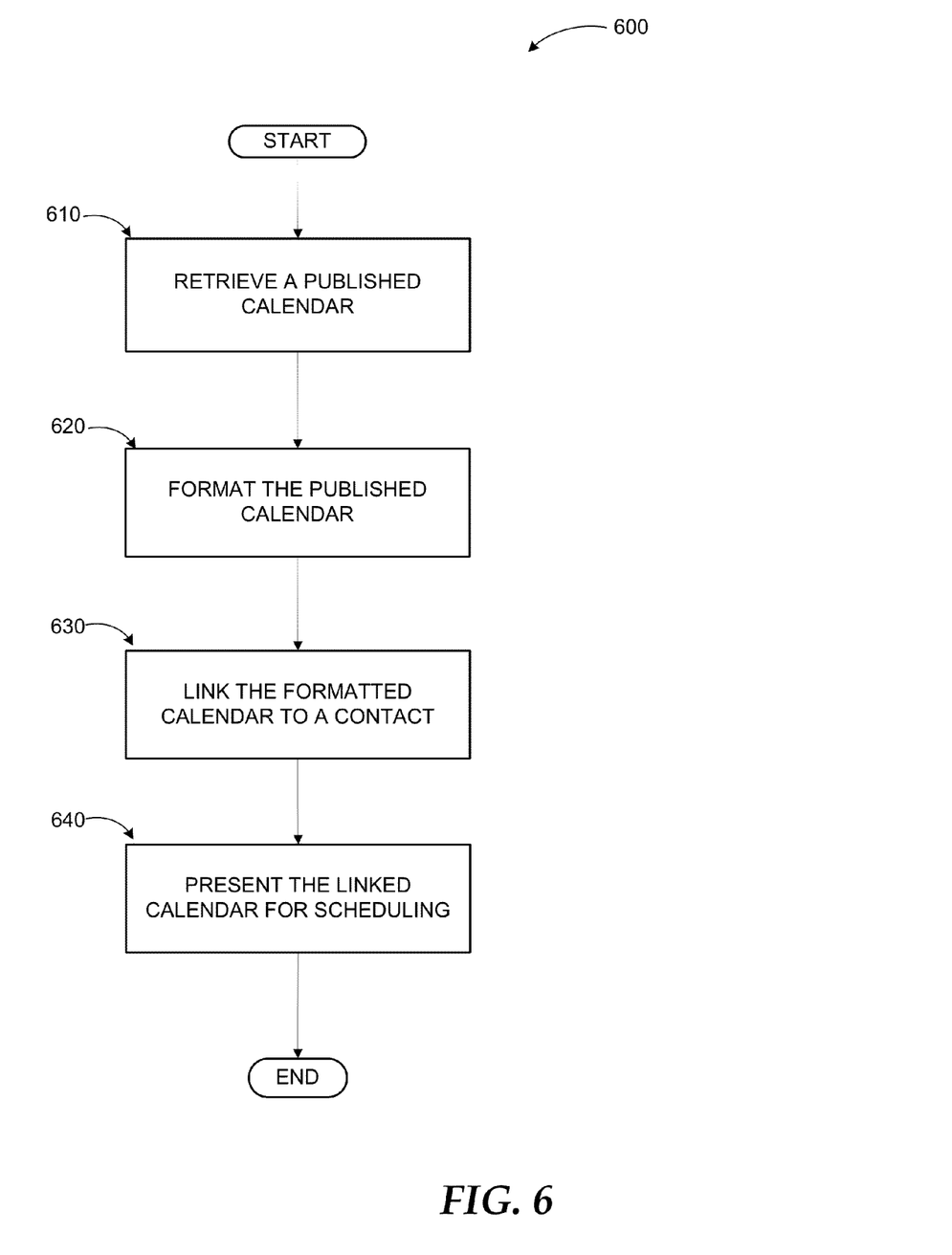
FIG. 6 illustrates a logic flow diagram for a process retrieving availability information from published calendars according to embodiments.

FIG. 6 illustrates a logic flow diagram for a process retrieving availability information from published calendars according to embodiments. Process 600 may be implemented by a communication or scheduling application in some examples.

Process 600 may begin with operation 610 where the application may retrieve a published calendar. The application may establish an https connection with a calendar application and download the calendar. At operation 620, the application may format the published calendar. The application may extract user status information from the published calendar and assign the information to a user status state such as "free" or "busy." Next, the application may link the formatted calendar to a contact at operation 630. The application may match calendar owner identifier information to a contact within a contact list of the application. The application may present the linked calendar for scheduling at operation 640.

In some embodiments, a decision engine may be executed to evaluate a conflict between a linked calendar and a published calendar. A status of the contact with status information from the published calendar may be updated upon a determination of up-to-date information from the published calendar.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 600 are for illustration purposes. Retrieving availability information from published calendars may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for retrieving availability information from published calendars, the method comprising:

determining a source for a published calendar;

retrieving the published calendar from the source;

formatting the published calendar to match a format of a calendar maintained by an application retrieving the published calendar;

extracting user status information and private user information from the published calendar;

formatting the published calendar to match a format of a calendar maintained by an application retrieving the published calendar;

evaluating a status description employed by the published calendar at a mapping engine, and mapping the status description to a corresponding status in the calendar maintained by the application at the mapping engine;

linking the formatted calendar to a contact maintained by the application by:
determining identifier information of an owner of the published calendar matching the identifier information to the contact;
presenting the linked calendar for scheduling; and
updating a status of the contact with status information from the published calendar based upon a determination of up-to-date information from the published calendar.

2. The method of claim 1, further comprising:
retrieving the published calendar from a web calendar service provider.

3. The method of claim 2, further comprising:
retrieving the published calendar from the web calendar service provider through an authenticated secure connection.

4. The method of claim 3, wherein the secure connection employs one of a hyper-text transfer protocol (https) and a secure file transfer protocol (sftp).

5. The method of claim 1, wherein formatting the published calendar includes assigning a user status within the published calendar to a user status within the calendar maintained by the application retrieving the published calendar, the user status including one from a set of: free, busy, tentative, out of office, and remotely available.

6. The method of claim 1, wherein linking the formatted calendar to the contact includes:
determining identifier information of an owner of the published calendar; and
matching the identifier information to the contact.

7. The method of claim 1, further comprising:
updating presence information of the contact with at least one user status from the linked calendar.

8. The method of claim 1, further comprising:
updating user status from the linked calendar with presence information of the contact.

9. The method of claim 1, wherein retrieving the published calendar comprises:
determining a uniform resource locator (URL) address of the published calendar; and
downloading the published calendar from the URL address of a web server hosting the published calendar.

10. The method of claim 1, further comprising:
upon a failure to retrieve the published calendar:
requesting authorization to download the published calendar from a web calendar service provider;
establishing access to the published calendar; and
downloading the published calendar.

11. A computing device for retrieving availability information from published calendars, the computing device comprising:
a memory configured to store instructions; and
a processor coupled to the memory, the processor executing an application in conjunction with the instructions stored in the memory, wherein the application is configured to:
determine a source for a published calendar;
retrieve the published calendar from the source;
retrieve calendar information from the published calendar including a location of one or more contacts associated with the published calendar and calendar event descriptions;
extract user status information from the published calendar;
format the published calendar at a calendar module by assigning a user status within the published calendar to a user status within a calendar maintained by the application, the user status including one from a set of: free, busy, tentative, out of office, and remotely available;
link the formatted calendar to a contact by:
determining identifier information of an owner of the published calendar;
matching the identifier information to the contact; and
present the linked calendar for scheduling anonymously with privacy data removed from the published calendar.

12. The computing device of claim 11, further adapted to:
retrieve another published calendar associated with the contact from another source.

13. The computing device of claim 12, further adapted to:
integrate the other published calendar with the linked calendar.

14. The computing device of claim 13, further adapted to:
execute a decision engine to evaluate a conflict between the linked calendar and the other published calendar; and
overwrite a status of the contact with status information from the other published calendar upon a determination of up-to-date information from the other published calendar.

15. The computing device of claim 11, wherein the identifier information is at least one from a set of: a name, an email address, and a user-id.

16. The computing device of claim 11, further adapted to:
utilize at least one from a set of: secure hyper-text transfer protocol (https), hypertext transfer protocol (http), file transfer protocol (ftp), and secure file transfer protocol (sftp) to retrieve the published calendar.

17. A computer-readable memory device with instructions stored thereon for retrieving availability information from published calendars, the instructions comprising:
determining a web calendar service provider for a published calendar;
retrieving the published calendar from the web calendar service provider;
upon a failure to retrieve the published calendar:
requesting authorization from the web calendar service provider;
downloading the published calendar using an alternative method;
extracting user status information and private user information from the published calendar;
formatting the published calendar to match a format of a calendar maintained by an application retrieving the published calendar;
evaluating a status description employed by the published calendar at a mapping engine, and mapping the status description to a corresponding status in the calendar maintained by the application at the mapping engine;
linking the formatted calendar to a contact maintained by the application by: determining identifier information of an owner of the published calendar
matching the identifier information to the contact;
presenting the linked calendar for scheduling; and
updating a status of the contact with status information from the published calendar based upon a determination of up-to-date information from the published calendar.

18. The computer-readable memory device of claim 17, wherein the instructions further comprise:
receiving a scheduled calendar event for the linked calendar from a client application.

19. The computer-readable memory device of claim 18, wherein the instructions further comprise:

formatting the scheduled calendar event according to parameters of the published calendar.

20. The computer-readable memory device of claim 17, wherein the instructions further comprise:
transmitting the formatted scheduled calendar event to the published calendar for scheduling at the published calendar.

* * * * *